United States Patent
Pan et al.

(10) Patent No.: US 9,210,617 B2
(45) Date of Patent: Dec. 8, 2015

(54) METHOD AND USER EQUIPMENT FOR SENDING UPLINK RESOURCE SCHEDULING REQUEST

(75) Inventors: Xueming Pan, Beijing (CN); Guoqing Li, Beijing (CN); Yanan Lin, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 724 days.

(21) Appl. No.: 13/498,682

(22) PCT Filed: Sep. 15, 2010

(86) PCT No.: PCT/CN2010/076933
§ 371 (c)(1),
(2), (4) Date: Mar. 28, 2012

(87) PCT Pub. No.: WO2011/038636
PCT Pub. Date: Apr. 7, 2011

(65) Prior Publication Data
US 2012/0182908 A1 Jul. 19, 2012

(30) Foreign Application Priority Data
Sep. 29, 2009 (CN) .......................... 2009 1 0235256

(51) Int. Cl.
*H04J 3/00* (2006.01)
*H04W 28/18* (2009.01)
(Continued)

(52) U.S. Cl.
CPC .............. *H04W 28/18* (2013.01); *H04W 24/02* (2013.01); *H04W 48/16* (2013.01)

(58) Field of Classification Search
CPC .................................. H04W 72/04; H04J 1/00

USPC .......................................................... 370/280
See application file for complete search history.

(56) References Cited

U.S. PATENT DOCUMENTS

| 2010/0309993 A1* | 12/2010 | Hao et al. ....................... 375/259 |
| 2011/0222428 A1* | 9/2011 | Charbit et al. ................. 370/252 |
| 2011/0292895 A1* | 12/2011 | Wager et al. .................. 370/329 |

FOREIGN PATENT DOCUMENTS

| CN | 101355788 A | 1/2009 |
| CN | 101426271 A | 5/2009 |

(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 8)", Technical Specification, (Sep. 2009), pp. 1-81.

(Continued)

*Primary Examiner* — Dang Ton
*Assistant Examiner* — Nourali Mansoury
(74) *Attorney, Agent, or Firm* — Barnes & Thornburg LLP

(57) ABSTRACT

A method for a user equipment sending an uplink resource scheduling request in a long term evolution mobile communication system and the user equipment thereof are provided. The present invention relates to a technique for the user equipment sending the uplink resource scheduling request in a long term evolution system, for reducing the user data transmission delay. The embodiments of the present invention set the minimum alternative option of the scheduling request transmission cycle configuration parameter as 2 ms or 1 ms, that is to say, add 2 ms or 1 ms, or 2 ms and 1 ms to the alternative option of the scheduling request transmission cycle configuration parameter, therefore, improving the flexibility of the whole system in the scheduling request transmission cycle configuration. When the data delay is required to be less, the user data transmission delay can be reduced, by using the 2 ms or 1 ms scheduling request transmission cycle configuration, to the delay requirement of 10 ms as close as possible.

14 Claims, 1 Drawing Sheet

Fig. 2

(51) Int. Cl.
 *H04W 24/02* (2009.01)
 *H04W 48/16* (2009.01)

(56) References Cited

FOREIGN PATENT DOCUMENTS

CN 101489305 A 7/2009
WO 2007148932 A1 12/2007

OTHER PUBLICATIONS

Ericsson, "Latency Improvement Comparison," 3GPP TSG-RAN WG2 #67, R2-094825, (Aug. 26, 2009), pp. 1-4.

Change Request, Version 8.8.0, "UE Procedure for Determining Physical Uplink Control Channel Assignment", 3GPP TSG-RAN WG1 Meeting #59, R1-095112, (Nov. 9-13, 2009).

"Contention Based UL Transmission Foe Dormant to Active State Transition Agenda Item: 7.2", 3GPP TSG RAN WG2 Meeting #67, R2-094215, (Aug. 24-28, 2009), pp. 1-5.

Change Request, Version 8.4.0, "UE Procedure for Determining Physical Uplink Control Channel Assignment", 3GPP TSG-RAN WG1 Meeting #59, R1-084646, (Nov. 10-14, 2009).

Search Report for International Patent Application No. PCT/CN2010/076933; Dec. 23, 2010.

* cited by examiner

--Prior Art--

METHOD AND USER EQUIPMENT FOR SENDING UPLINK RESOURCE SCHEDULING REQUEST

The present application is a US National Stage of International Application No. PCT/CN2010/076933, filed 15 Sep. 2010, designating the United States, and claiming priority to Chinese Patent Application No. 200910235256.X, filed with the State Intellectual Property Office of the People's Republic of China on Sep. 29, 2009 and entitled "Method for sending uplink resource scheduling request and user equipment", which is hereby incorporated by reference in its entirety.

FIELD OF THE INVENTION

The present invention relates to the field of mobile communications and particularly to a technology for sending an uplink resource scheduling request from a user equipment in a Long Term Evolution (LTE) system.

BACKGROUND OF THE INVENTION

Along with flourishing development of mobile communications, radio communication systems have exhibited the trend of becoming mobility-, broadband- and IP-enabled, and the competition for the mobile communication market has also become increasingly intensive. In order to cope with the challenge from traditional and emerging radio broadband access technologies, e.g., World Interoperability for Microwave Access (WiMAX), Wireless Fidelity (Wi-Fi), etc., and to to improve the competitiveness of the 3G in the broadband radio access market, the 3GPP has studies the long term evolution technology of Universal Terrestrial Radio Access (UTRA) for the purpose of smooth transition from the technology of 3G to the Beyond three Generation (B3G) and the 4G. An LTE system includes two duplex modes, i.e., Time Division Duplex (TDD) and Frequency Division Duplex (FDD). Two separate channels are required for Frequency Division Duplex (FDD), also referred to as full duplex. Information is transmitted in the downlink over one of the channels and in the uplink over the other channel. There is a guard band between the two channels to prevent mutual interference from occurring between a transmitter and an adjacent receiver. Only one channel is required for Time Division Duplex (TDD), also referred to as half duplex, and information is transmitted in both the downlink and the uplink over the same channel.

Frame structures of FDD and TDD are designed respectively for the LTE system, and in the FDD mode, each 10 ms radio frame is divided into ten subframes each including two time slots each with a length of 0.5 ms. FIG. 1 illustrates the frame structure of TDD in which each 10 ms radio frame is divided into two duplicate half-frames each consisted of four service subframes and one special subframe, where the service subframe with a length of 1 ms includes two 0.5 ms service Time Slots (TSs) and the special subframe includes three special time slots, i.e., a Downlink Pilot Time Slot (DwPTS) in which a downlink synchronization signal is transmitted, a Guard Period (GP) which is a guard period for transition from downlink transmission to uplink transmission, and an Uplink Pilot Time Slot (UpPTS) for an uplink random access. Each half-frame is configured with a pair of switching points including a downlink to uplink switching point in the GP and an uplink to downlink switching point at a boundary of a service subframe other than the service subframe #0, and no switching can be performed between the uplink and the downlink in two service time slots of the same service subframe. Reference is made to Table 1 illustrating numerous schemes of configurations of the proportion of time slots in a TDD system:

TABLE 1

| Uplink and downlink configuration structure | Period of switching from uplink to downlink | Serial number of subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Where the serial number of an uplink and downlink configuration structure in Table 1 is the serial number of a pattern of uplink and downlink time slots configuration in the TDD system, i.e., a pattern 0, a pattern 1, . . . , and a pattern 6.

A Physical Uplink Control Channel (PUCCH) is a primary transmission channel over which uplink control information is borne, and there are numerous transmission formats for the PUCCH. In an LTE Release 8 (Rel-8) system, a Scheduling Request (SR) for an uplink resource is transmitted in a first transmission format (Format 1). A User Equipment (UE) sends the scheduling request to an evolved NodeB (eNB) to request an uplink resource to be scheduled and subsequently reports the status of a transmission buffer, and the eNB schedules an appropriate uplink resource to the UE for data transmission according to the status of the buffer area and the channel quality. In the LTE Rel-8, a scheduling request is sent periodically, and each user equipment performs the sending at a subframe offset and over a channel resource, both of which are preconfigured. Since uplink data transmission depends upon a scheduling request triggering a resource request, a delay of uplink user data is determined directly by the length of a transmission periodicity of the scheduling request.

An index of a PUCCH, over which a scheduling request is sent, and a jointly encoded indicator of sr-ConfigIndex for a transmission periodicity and a subframe offset of the scheduling request in Radio Resource Control (RRC) signalling configured for the scheduling request have been described in the LTE Rel-8 high layer specification TS36.331, and the transmission periodicity and the subframe offset of the SR are specified in the physical layer specification TS36.213 of the LTE R8 as illustrated in Table 2 below:

TABLE 2

| SR configuration Index $I_{SR}$ (corresponding to sr-ConfigIndex in the high layer specification) | SR periodicity (ms) | SR subframe offset |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155 | | Reserved |

As depicted in Table 2, configured SR transmission periodicities of 5 ms, 10 ms, 20 ms, 40 ms, and 80 ms, among which the shortest transmission periodicity is 5 ms, are provided in the LTE R8 high layer specification. As can be apparent in Table 2, sr-ConfigIndex $I_{SR}$ carried in the RRC signalling can be parsed, and when $I_{SR}$ is larger than or equal to 0 and less than or equal to 4, an SR transmission periodicity is 5 ms, and a subframe in which an SR is sent in each transmission periodicity is the $I_{SR}^{th}$ subframe in the transmission periodicity; when $I_{SR}$ is larger than or equal to 5 and less than or equal to 14, an SR transmission periodicity is 10 ms, and a subframe in which an SR is sent in each transmission periodicity is the $(I_{SR}-5)^{th}$ subframe in the transmission periodicity; and so on.

The inventors have identified that there is a demand for a delay between an Active status, an Active-"dormant" status and a Camped status of a user equipment as defined in the existing specification, where there is a demand for a delay of approximately 10 ms from the Active-"dormant" status to the Active status, and the shortest transmission periodicity of 5 ms means only one opportunity of uplink data transmission available to the user equipment per 5 ms, thus resulting in a serious delay of user data. Taking the shortest transmission periodicity of 5 ms as an example, a method for calculating the delay of Active-"dormant"→Active in an FDD system is as depicted in Table 3:

TABLE 3

| Component | Description | Time [ms] |
|---|---|---|
| 1 | Average delay to next SR opportunity (5 ms PUCCH cycle) | 2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay | 11.5 |

A method for calculating the delay of Dormant→Active in a TDD system is as depicted in Table 4:

TABLE 4

| Component | Description | Time [ms] SR in subframe #2 or #7 | Time [ms] SR in subframe #3 or #8 |
|---|---|---|---|
| 1 | Average delay to next SR opportunity (5 ms PUCCH cycle) | 2.5 | 2.5 |
| 2 | UE sends Scheduling Request | 1 | 1 |
| 3 | eNB decodes Scheduling Request and generates the Scheduling Grant + delay for nearest DL subframe | 3 | 5 |
| 4 | Transmission of Scheduling Grant | 1 | 1 |
| 5 | UE Processing Delay (decoding of scheduling grant + L1 encoding of UL data) | 5 | 3 |
| 6 | Transmission of UL data + delay for nearest UL subframe | 1 | 1 |
|  | Total delay | 13.5 | 13.5 |

With an SR transmission periodicity larger than 5 ms, the total delay becomes longer, and an excessive total delay may result in failing to transmit user data in time and consequentially a too long latency, which is a primary factor of failing to accommodate the demand for a 10 ms delay from Active-"dormant" to Active.

SUMMARY OF THE INVENTION

Embodiments of the invention provide a method for sending an uplink resource scheduling request from a user equipment in a Long Term Evolution (LTE) mobile communication system and a user equipment in order to shorten a transmission delay of user data.

To this end, the embodiments of the invention provide the following technical solutions.

A method for sending an uplink resource scheduling request from a user equipment includes:
receiving, by the user equipment, RRC signalling from an eNodeB;
acquiring, by the user equipment, from the RRC signalling a configuration parameter indicator indicating a transmission periodicity of the uplink resource scheduling request and a subframe offset at which the uplink resource scheduling request is sent, wherein transmission periodicity configuration options include 1 ms and/or 2 ms; and
sending, by the user equipment, the uplink resource scheduling request according to the configuration parameter indicator.

A user equipment includes:
a receiving unit configured to receive RRC signalling from an eNodeB;
an acquiring unit configured to acquire from the RRC signalling a configuration parameter indicator indicating a transmission periodicity of an uplink resource scheduling request and a subframe offset at which the uplink resource scheduling request is sent, wherein transmission periodicity configuration options include 1 ms and/or 2 ms; and
a sending unit configured to send the uplink resource scheduling request according to the configuration parameter indicator.

A method for instructing a user equipment to send an uplink resource scheduling request includes:
configuring, by an eNodeB, a configuration parameter indicator indicating a transmission periodicity of the uplink resource scheduling request and a subframe offset at which the uplink resource scheduling request is sent, wherein transmission periodicity configuration options include 1 ms and/or 2 ms; and
sending, by the eNodeB, the configuration parameter indicator to the user equipment in RRC signalling.

An eNodeB includes:
a configuring module configured to configure a configuration parameter indicator indicating a transmission periodicity of an uplink resource scheduling request and a subframe offset at which the uplink resource scheduling request is sent, wherein transmission periodicity configuration options include 1 ms and/or 2 ms; and
a sending module configured to send the configuration parameter indicator to a user equipment in RRC signalling.

In the technical solutions according to the embodiments of the invention, the minimum setting among the options for the configuration parameter of an SR transmission periodicity is 2 ms or 1 ms, that is, 2 ms or 1 ms is added, or possibly both of them can be added, to the options for the configuration parameter of an SR transmission periodicity to thereby improve the flexibility of the entire system in configuring an SR transmission periodicity, and for a required low delay of data, an SR transmission periodicity can be configured as 2 ms or 1 ms to thereby have a reduced delay in transmission of user data approach to the largest extent the demand for a 10 ms delay from Active-"dormant" to Active as required in the existing specification.

DETAILED DESCRIPTION OF THE EMBODIMENTS

Figure 1:
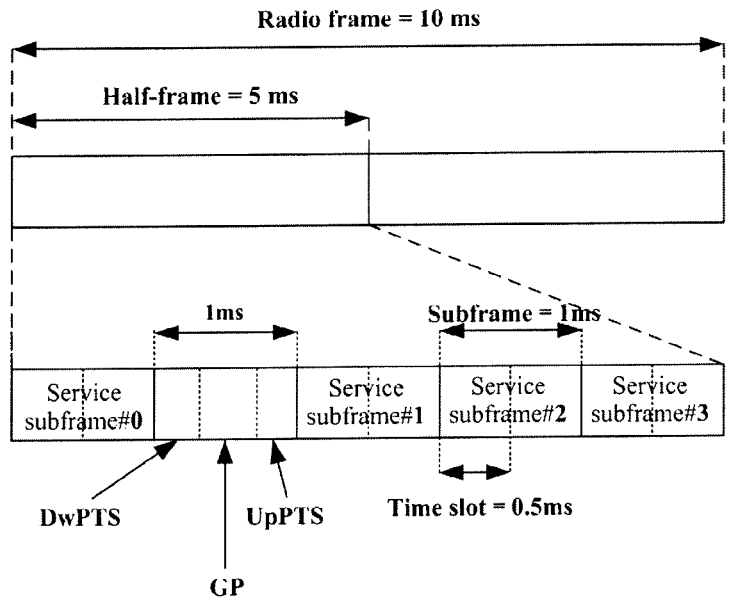
FIG. 1 is a schematic diagram of a TDD frame structure in the prior art.

It is proposed in embodiments of the invention to add the setting of 2 ms or 1 ms to the options for the configuration parameter of an SR transmission periodicity to reduce data delay, and with an SR transmission periodicity configured as 2 ms or 1 ms, a user equipment can be provided with more opportunities to send an SR requesting an uplink resource and thus can be provided as fast as possible with an uplink resource for data transmission if the user equipment has data to be transmitted, thereby reducing a delay of the user data and approaching the demand of a 10 ms delay from Active-"dormant" to Active. An implementation principle of the technical solution of the invention will be detailed below in connection with two systems of FDD and TDD.

I. FDD System

1. With an SR transmission periodicity configured as 2 ms, a user equipment is provided with one transmission opportunity per 2 ms in an uplink frame, and there are two configuration modes of odd and even for a subframe offset, that is, a subframe in which an uplink resource scheduling request is sent is configured as each odd subframe or each even subframe over an uplink carrier.

2. With an SR transmission periodicity configured as 1 ms, a user equipment is provided with one transmission opportunity in each subframe of an uplink frame, that is, a subframe in which an uplink resource scheduling request is sent is configured as each subframe of an uplink frame.

With a jointly encoded indicator, each of different configuration options for a transmission periodicity and a subframe offset is identified with a corresponding jointly encoded indicator, so:

one SR configuration option may be added when only the shortest SR transmission periodicity of 1 ms is added to the SR transmission periodicity configurations;

two SR configuration options may be added when only the shortest SR transmission periodicity of 2 ms is added to the SR transmission periodicity configurations; and three SR configuration options may be added when both 1 ms and 2 ms are added to the SR transmission periodicity configurations and the shortest SR transmission periodicity is 1 ms.

II. TDD System

As defined for an SR transmission periodicity of 2 ms, there are two SR transmission opportunities per 5 ms, that is, if there is an SR transmission periodicity configured as 2 ms, subframes in which an uplink resource scheduling request is sent is configured as any two uplink subframes in each half-frame.

As defined for an SR transmission periodicity of 1 ms, there is one SR transmission opportunity in each uplink subframe per 5 ms, that is, if there is an SR transmission periodicity configured as 1 ms, a subframe in which an uplink resource scheduling request is sent is configured as each uplink subframe in a half-frame.

In the pattern 2 and the pattern 5 depicted in Table 1, there is only one uplink subframe in an uplink and downlink switching period of each half-frame, so there is no SR transmission opportunity added compared with a transmission periodicity of 5 ms even if 1 ms and 2 ms are taken as configured SR transmission periodicities, and the configured SR transmission periodicities of 1 ms and 2 ms can be taken as invalid for the pattern 2 and the pattern 5 but valid for the other patterns 0, 1, 3, 4 and 6. Upon acquisition of an configuration parameter indicator, a user equipment can take the configuration parameter indicator as an invalid parameter and make another request if it is determined that the transmission periodicity is configured as 2 ms and uplink and downlink subframes are configured in the pattern 2 or the pattern 5; otherwise, the user equipment can take the configuration parameter indicator as a valid parameter and send an uplink resource scheduling request according to the configuration parameter indicator.

It shall be further noted that, since a half-frame in the uplink and downlink configuration patterns 1 and 4 includes two uplink subframes, a configured SR transmission periodicity of 1 ms or 2 ms is actually identical in that there are two SR transmission opportunities in each half-frame.

When there are three uplink subframes at most per 5 ms in the case of a transition point period of 5 ms in a TDD system, any two of the subframes can be selected for transmission of an SR at a configured SR transmission periodicity of 2 ms, thus resulting in three selections. For example, there are uplink subframes numbered 0, 1 and 2, and any two of them are selected to form three different configured subframe offsets, i.e., {0, 1}, {0, 2} and {1, 2}, so three configuration options will be required for an indicator in the case of joint encoding.

Thus considering the jointly encoded indicator of an SR periodicity and an SR subframe offset in the existing LTE R8:

one SR configuration option may be added when only the shortest SR transmission periodicity of 1 ms is added to the configured SR transmission periodicities;

three SR configuration options may be added when only the shortest SR transmission periodicity of 2 ms is added to the configured SR transmission periodicities; and four SR configuration options may be added when both 1 ms and 2 ms are added to the configured SR transmission periodicities and the shortest SR transmission periodicity is 1 ms.

With an SR transmission periodicity of 1 ms or 2 ms, a delay in transmission of user data can be shorten effectively for some proportions of time slots, for example:

1) with the pattern 0, an SR transmission periodicity configured as 1 ms and an SR is sent in all the uplink subframes for TDD, a total delay is calculated as depicted in Table 5 below, where delay in data transmission can be lowered effectively to 10.1 ms:

TABLE 5

| Component | Description | Time [ms] |
|---|---|---|
| 1 | Average delay to next SR opportunity (5 ms PUCCH cycle) | 1.1 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 10.1 |

2) with the pattern 0, an SR transmission periodicity configured as 2 ms and an uplink subframe, in which an SR is transmitted, being located in subframes numbered 2, 4, 7 and 9 in a radio frame for TDD, a total delay is calculated as depicted in Table 6 below, where delay in data transmission can be lowered effectively to 10.9 ms:

TABLE 6

| Component | Description | Time [ms] |
|---|---|---|
| 1 | Average delay to next SR opportunity (5 ms PUCCH cycle) | 1.9 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay | 10.9 |

3) with the pattern 1, an SR transmission periodicity configured as 1 ms and an SR is sent in all the uplink subframes for TDD, a total delay is calculated as depicted in Table 7 below, where delay in data transmission can be lowered effectively to 10.7 ms:

TABLE 7

| Component | Description | Time [ms] |
|---|---|---|
| 1 | Average delay to next SR opportunity (5 ms PUCCH cycle) | 1.7 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay | 10.7 | with the pattern 1, an SR transmission periodicity configured as 2 ms and a subframe, in which an SR is transmitted, being subframes numbered 2, 3, 7 and 8 in a radio frame for TDD, a total delay is the same as that at a periodicity of 5 ms. Other scenarios can occur similarly to those skilled in the art and will not be enumerated here.

Thus the minimum setting among the options for the configuration parameter of an SR transmission periodicity is 2 ms or 1 ms, that is, 2 ms or 1 ms is added, or possibly both of them can be added, to the options for the configuration parameter of an SR transmission periodicity to thereby improve the flexibility of the entire system in configuring an SR transmission periodicity, and for a required low delay of data, an SR transmission periodicity can be configured as 2 ms or 1 ms to thereby have a reduced delay in transmission of user data approach the demand for a 10 ms delay to the largest extent.

Referring to Table 2, 1 ms and 2 ms can be jointly encoded with the other configured transmission periodicity options. For example, joint encoding as depicted in Table 8 below results from the addition of only a configured SR transmission periodicity of 1 ms:

TABLE 8

| SR configuration Index $I_{SR}$ (corresponding to sr-ConfigIndex in the high layer specification) | SR periodicity (ms) (SR transmission periodicity) | SR subframe offset (SR transmission subframe offset) |
|---|---|---|
| 0 | 1 | $I_{SR}$ |
| 1-5 | 5 | $I_{SR}$-1 |

TABLE 8-continued

| SR configuration Index $I_{SR}$ (corresponding to sr-ConfigIndex in the high layer specification) | SR periodicity (ms) (SR transmission periodicity) | SR subframe offset (SR transmission subframe offset) |
|---|---|---|
| 6-15 | 10 | $I_{SR}$-6 |
| 16-35 | 20 | $I_{SR}$-16 |
| 36-75 | 40 | $I_{SR}$-36 |
| 76-155 | 80 | $I_{SR}$-76 |

In this encoding mode, all the configured transmission periodicity options are jointly encoded, and a jointly encoded indicator is carried in the SR configuration index $I_{SR}$ in the existing set of parameters of RRC signalling.

For compatibility with the configured SR transmission periodicities of 5 ms, 10 ms, 20 ms, 40 ms, 80 ms, etc., available in the existing LTE R8 high layer specification, an SR transmission periodicity of 1 ms or 2 ms can alternatively be jointly encoded separately, where the result of jointly encoding each configuration option is indicated with a serial number N. A new set of parameters for a number of different configuration schemes of 1 ms or 2 ms is added to RRC signalling in parallel to the original set of parameters of a jointly encoded indicator to carry an extended jointly encoded indicator of a configuration option. The indicator can be extended, for example, in a way that firstly a set of parameters, schedulingRequestConfig-ext, and then specific configured parameter values for the set of parameters are added to an existing dedicated configuration Information Element (IE) at the physical layer, where the serial number N of a configuration option is taken as a jointly encoded indicator of a configuration option of an SR transmission periodicity of 1 ms or 2 ms according to the result of jointly encoding an SR transmission periodicity of 1 ms or 2 ms. The N in the set of parameters is set according to the serial number of an SR configuration option added at the physical layer.

When there are two sets of jointly encoded parameters parallel in RRC signalling, the validity of the sets of parameters can be indicated in various manners. For example, a separate indicator can be carried in RRC signalling to indicate the validity, or a specific parameter value can be carried for a valid set of parameters while no specific parameter value or an invalid parameter value can be carried for an invalid set of parameters, and so on, it will not be enumerated here.

In this encoding mode, respective configuration options of the transmission periodicity of 2 ms and/or 1 ms are jointly encoded while the other transmission periodicity configuration options are jointly encoded, thus resulting in two groups of jointing encoding, and two groups of jointly encoded indicators are carried in different sets of parameters of RRC signalling.

Figure 2:
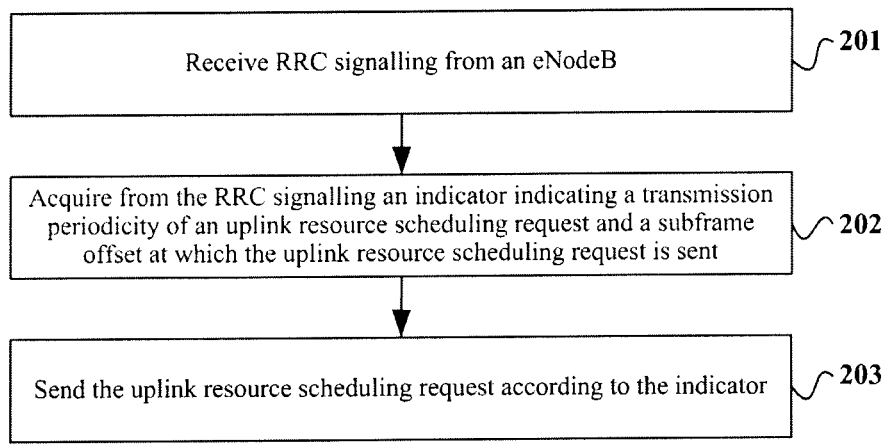
FIG. 2 is a schematic flow chart of sending an SR from a user equipment according to an embodiment of the invention.

Following the foregoing idea and as illustrated in FIG. 2, an embodiment of the invention provides a method for sending an uplink resource scheduling request from a user equipment in an LTE system, and the method includes the following operations.

The operation S201 is to receive RRC signalling from an eNodeB.

The operation S202 is to acquire from the RRC signalling a configuration parameter indicator indicating a transmission periodicity of an uplink resource scheduling request and a subframe offset at which the uplink resource scheduling request is sent, where transmission periodicity configuration options include 2 ms, or 1 ms, or 2 ms and 1 ms.

The operation S203 is to send the uplink resource scheduling request according to the configuration parameter indicator.

Figure 3:
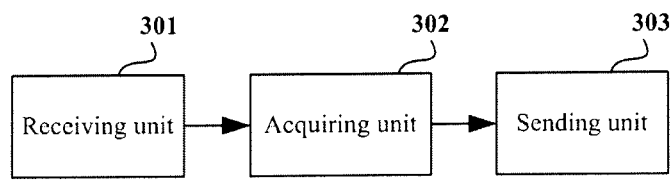
FIG. 3 is a schematic structural diagram of a user equipment according to an embodiment of the invention.

Following the foregoing idea and as illustrated in FIG. 3, an embodiment of the invention further provides a user equipment in an LTE mobile communication system, and the user equipment includes:

a receiving unit 301 configured to receive RRC signalling from an eNodeB;

an acquiring unit 302 configured to acquire from the RRC signalling a configuration parameter indicator indicating a transmission periodicity of an uplink resource scheduling request and a subframe offset at which the uplink resource scheduling request is sent, where transmission periodicity configuration options include 1 ms and/or 2 ms; and a sending unit 303 configured to send the uplink resource scheduling request according to the configuration parameter indicator.

In an implementation, the acquiring unit may further be configured to acquire from the configuration parameter indicator a subframe in which the uplink resource scheduling request is sent and which is configured as each subframe over an uplink carrier when Frequency Division Duplex (FDD) is adopted for the LTE mobile communication system and the transmission periodicity is configured as 1 ms; or to acquire from the configuration parameter indicator a subframe in which the uplink resource scheduling request is sent and which is configured as each uplink subframe in each half-frame when Time Division Duplex (TDD) is adopted for the LTE mobile communication system and the transmission periodicity is configured as 1 ms.

In an implementation, the acquiring unit may further be configured to acquire from the configuration parameter indicator a subframe in which the uplink resource scheduling request is sent and which is configured as each odd subframe or each even subframe over an uplink carrier when FDD is adopted for the LTE mobile communication system and the transmission periodicity is configured as 2 ms; or to acquire from the configuration parameter indicator subframes in which the uplink resource scheduling request is sent and which are configured as any two uplink subframes in each half-frame when TDD is adopted for the LTE mobile communication system and the transmission periodicity is configured as 2 ms.

In an implementation, when TDD is adopted for the LTE mobile communication system, uplink and downlink subframes of the LTE mobile communication system are configured in the pattern 0, the pattern 1, the pattern 3, the pattern 4 or the pattern 6; and after the configuration parameter indicator is acquired, the sending unit may further be configured to take the configuration parameter indicator as an invalid parameter if it is determined that the transmission periodicity is configured as 1 ms or 2 ms and the uplink and downlink subframes are configured in the pattern 2 or the pattern 5; otherwise, take the configuration parameter indicator as a valid parameter and send the uplink resource scheduling request according to the configuration parameter indicator.

In an implementation, the acquiring unit may further be configured to acquire the configuration parameter indicator which is a jointly encoded indicator of the transmission periodicity and the subframe offset, where each of the different configuration options for the transmission periodicity and the subframe offset is identified with a corresponding jointly encoded indicator.

In an implementation, all the transmission periodicity configuration options are jointly encoded; or the transmission periodicity configuration options of 2 ms and/or 1 ms are jointly encoded while the other transmission periodicity configuration options are jointly encoded, and two groups of jointly encoded indicators are carried in different sets of parameters of the RRC signalling.

In an implementation, the sending unit may further be configured to send the uplink resource scheduling request according to the configuration parameter indicator by sending the uplink resource scheduling request including an indicator of whether there is a demand for data transmission in each subframe for sending the uplink resource scheduling request or by sending the uplink resource scheduling request in a corresponding subframe for sending the uplink resource scheduling request upon a demand for data transmission.

Reference can be made to the foregoing description for details of configuration schemes and joint encoding schemes in an FDD system and a TDD system, and a repeated description thereof will be omitted here.

Following the foregoing embodiments, there is also a method for instructing a user equipment to send an uplink resource scheduling request, and this method includes the following operations:

an eNodeB configures a configuration parameter indicator indicating a transmission periodicity of an uplink resource scheduling request and a subframe offset at which the uplink resource scheduling request is sent, where transmission periodicity configuration options include 1 ms and/or 2 ms; and the eNodeB sends the configuration parameter indicator to a user equipment in RRC signalling.

In an implementation, a subframe in which the uplink resource scheduling request is sent is configured as each subframe over an uplink carrier when Frequency Division Duplex (FDD) is adopted for an LTE mobile communication system and the transmission periodicity is configured as 1 ms; or a subframe in which the uplink resource scheduling request is sent is configured as each uplink subframe in each half-frame when Time Division Duplex (TDD) is adopted for an LTE mobile communication system and the transmission periodicity is configured as 1 ms.

In an implementation, a subframe in which the uplink resource scheduling request is sent is configured as each odd subframe or each even subframe over an uplink carrier when FDD is adopted for an LTE mobile communication system and the transmission periodicity is configured as 2 ms; or subframes in which the uplink resource scheduling request is transmitted are configured as any two uplink subframes in each half-frame when TDD is adopted for an LTE mobile communication system and the transmission periodicity is configured as 2 ms.

In an implementation, uplink and downlink subframes of the LTE mobile communication system are configured in the pattern 0, the pattern 1, the pattern 3, the pattern 4 or the pattern 6 when TDD is adopted for the LTE mobile communication system.

In an implementation, the configuration parameter indicator is a jointly encoded indicator of the transmission periodicity and the subframe offset, and each of the different configuration options for the transmission periodicity and the subframe offset is identified with a corresponding jointly encoded indicator.

In an implementation, all the transmission periodicity configuration options are jointly encoded; or the transmission periodicity configuration options of 2 ms and/or 1 ms are jointly encoded while the other transmission periodicity configuration options are jointly encoded, and two groups of jointly encoded indicators are carried in different sets of parameters of the RRC signalling.

Following the foregoing embodiments, there is also a corresponding eNodeB including:

a configuring module configured to configure a configuration parameter indicator indicating a transmission periodicity of an uplink resource scheduling request and a subframe offset at which the uplink resource scheduling request is sent, where transmission periodicity configuration options include 1 ms and/or 2 ms; and a transmitting module configured to send the configuration parameter indicator to a user equipment in RRC signalling.

In an implementation, the configuring module may further be configured to configure a subframe in which the uplink resource scheduling request is sent as each subframe over an uplink carrier when Frequency Division Duplex (FDD) is adopted for an LTE mobile communication system and the transmission periodicity is configured as 1 ms; or to configure a subframe in which the uplink resource scheduling request is sent as each uplink subframe in each half-frame when Time Division Duplex (TDD) is adopted for an LTE mobile communication system and the transmission periodicity is configured as 1 ms.

In an implementation, the configuring module may further be configured to configure a subframe in which the uplink resource scheduling request is sent as each odd subframe or each even subframe over an uplink carrier when FDD is adopted for an LTE mobile communication system and the transmission periodicity is configured as 2 ms; or to configure subframes in which the uplink resource scheduling request is sent as any two uplink subframes in each half-frame when TDD is adopted for an LTE mobile communication system and the transmission periodicity is configured as 2 ms.

In an implementation, the configuring module may further be configured to configure uplink and downlink subframes of the LTE mobile communication system in the pattern 0, the pattern 1, the pattern 3, the pattern 4 or the pattern 6 when TDD is adopted for the LTE mobile communication system.

In an implementation, the configuring module may further be configured to configure the configuration parameter indicator as a jointly encoded indicator of the transmission periodicity and the subframe offset, and each of the different configuration options for the transmission periodicity and the subframe offset is identified with a corresponding jointly encoded indicator.

In an implementation, the configuring module may further be configured to jointly encode the transmission periodicity configuration options; or to jointly encode the transmission periodicity configuration options of 2 ms and/or 1 ms while jointly encode the other transmission periodicity configuration options, and to carry two groups of jointly encoded indicators in different sets of parameters of the RRC signalling.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for sending an uplink resource scheduling request from a user equipment, comprising:

receiving, by the user equipment, Radio Resource Control, RRC, signalling from an eNodeB;

acquiring, by the user equipment, from the RRC signalling a configuration parameter indicator indicating a transmission periodicity of the uplink resource scheduling request and a subframe offset at which the uplink resource scheduling request is sent, wherein transmission periodicity configuration is configured as 1 ms and/or 2 ms; and sending, by the user equipment, the uplink resource scheduling request according to has been the configuration parameter indicator;

wherein a subframe in which the uplink resource scheduling request is sent is configured as each subframe over an uplink carrier when Frequency Division Duplex, FDD, is adopted for an LTE mobile communication system and the transmission periodicity is configured as 1 ms; or a subframe in which the uplink resource scheduling request is sent is configured as each uplink subframe in each half frame when Time Division Duplex, TDD, is adopted for the LTE mobile communication system and the transmission periodicity is configured as 1 ms;

wherein uplink and downlink subframes of the LTE mobile communication system are configured in a pattern 0, a pattern 1, a pattern 3, a pattern 4 or a pattern 6 when the TDD is adopted for the LTE mobile communication system; and the method further comprises: after acquiring the configuration parameter indicator, taking the configuration parameter indicator as an invalid parameter if it is determined that the transmission periodicity is configured as 1 ms or 2 ms and the uplink and downlink sub are configured in a pattern 2 or a pattern 5; otherwise, taking the configuration parameter indicator as a valid parameter and sending the uplink resource scheduling request according to the configuration parameter indicator.

2. The method according to claim 1, wherein:

a subframe in which the uplink resource scheduling request is sent is configured as each odd subframe or each even subframe over an uplink carrier when FDD is adopted for an LTE mobile communication system and the transmission periodicity is configured as 2 ms; or subframes in which the uplink resource scheduling request is sent is configured as any two uplink subframes in each half-frame when TDD is adopted for the LTE mobile communication system and the transmission periodicity is configured as 2 ms.

3. The method according to claim 2, wherein uplink and downlink subframes of the LTE mobile communication system are configured in a pattern 0, a pattern 1, a pattern 3, a pattern 4 or a pattern 6 when the TDD is adopted for the LTE mobile communication system; and the method further comprises: after acquiring the configuration parameter indicator, taking the configuration parameter indicator as an invalid parameter if it is determined that the transmission periodicity is configured as 1 ms or 2 ms and the uplink and downlink subframes are configured in a pattern 2 or a pattern 5; otherwise, taking the configuration parameter indicator as a valid parameter and sending the uplink resource scheduling request according to the configuration parameter indicator.

4. The method according to claim 1, wherein the configuration parameter indicator is a jointly encoded indicator of the transmission periodicity and the subframe offset, and each of different configuration options for the transmission periodicity and the subframe offset is identified with a corresponding jointly encoded indicator.

5. The method according to claim 1, wherein sending the uplink resource scheduling request according to the configuration parameter indicator comprises:

sending the uplink resource scheduling request comprising an indicator of whether there is a demand for data transmission in each subframe for sending the uplink resource scheduling request; or sending the uplink resource scheduling request in a corresponding subframe for sending the uplink resource scheduling request upon a demand for the data transmission.

6. A user equipment, comprising:
a receiving unit configured to receive Radio Resource Control, RRC, signalling from an eNodeB;
an acquiring unit configured to acquire from the RRC signalling a configuration parameter indicator indicating a transmission periodicity of an uplink resource scheduling request and a subframe offset at which the uplink resource scheduling request is sent, wherein transmission periodicity configuration is configured as 1 ms and/or 2 ms; and
a sending unit configured to send the uplink resource scheduling request according to the configuration parameter indicator;
wherein the acquiring unit is further configured to acquire from the configuration parameter indicator a subframe in which the uplink resource scheduling request is seat and which is configured as each subframe over an uplink carrier when Frequency Division Duplex, FDD, is adopted for an LTE mobile communication system and the transmission periodicity is configured as 1 ms; or to acquire from the configuration parameter indicator a subframe in which the uplink resource scheduling request is sent and which is configured as each uplink subframe in each half-frame when Time Division Duplex, TDD, is adopted for the LTE mobile communication system and the transmission periodicity is configured as 1 ms;
wherein the TDD is adopted for the LLE mobile communication system, uplink and downlink subframes of the LTE mobile communication system are configured in a pattern 0, a pattern I, a pattern 3, a pattern 4 or a pattern 6; and after the configuration parameter indicator is acquired, the sending unit is further configured to take the configuration parameter indicator as an invalid parameter if it is determined that the transmission periodicity is configured as 1 ms or 2 ms and the uplink and downlink subframes are configured in a pattern 2 or a pattern 5; otherwise, take the configuration parameter indicator as a valid parameter and send the uplink resource scheduling request according to the configuration parameter indicator.

7. The user equipment according to claim 6, wherein the acquiring unit is further configured to acquire from the configuration parameter indicator a subframe in which the uplink resource scheduling request is sent and which is configured as each odd subframe or each even subframe over an uplink carrier when FDD is adopted for an LTE mobile communication system and the transmission periodicity is configured as 2 ms; or to acquire from configuration parameter indicator subframes in which the uplink resource scheduling request is sent and which are configured as any two uplink subframes in each half-frame when TDD is adopted for the LTE mobile communication system and the transmission periodicity is configured as 2 ms.

8. The user equipment according to claim 7, wherein when the TDD is adopted for the LTE mobile communication system, uplink and downlink subframes of the LTE mobile communication system are configured in a pattern 0, a pattern 1, a pattern 3, a pattern 4 or a pattern 6; and after the configuration parameter indicator is acquired, the sending unit is further configured to take the configuration parameter indicator as an invalid parameter if it is determined that the transmission periodicity is configured as 1 ms or 2 ms and the uplink and downlink sub frames are configured in a pattern 2 or a pattern 5; otherwise, take the configuration parameter indicator as a valid parameter and send the uplink resource scheduling request according to the configuration parameter indicator.

9. The user equipment according to claim 6, wherein the acquiring unit is further configured to acquire the configuration parameter indicator which is a jointly encoded indicator of the transmission periodicity and the subframe offset, wherein each of different configuration options for the transmission periodicity and the subframe offset is identified with a corresponding jointly encoded indicator.

10. The user equipment according to claim 6, wherein the sending unit is further configured to send the uplink resource scheduling request according to the configuration parameter indicator by sending the uplink resource scheduling request comprising an indicator of whether there is a demand for data transmission in each subframe for sending the uplink resource scheduling request or by sending the uplink resource scheduling request in a corresponding subframe for sending the uplink resource scheduling request upon a demand for the data transmission.

11. A method for instructing a user equipment to send an uplink resource scheduling request, comprising:
configuring, by an eNodeB, a configuration parameter indicator indicating a transmission periodicity of the uplink resource scheduling request and a subframe offset at which the uplink resource scheduling request is sent, wherein transmission periodicity configuration is configured as 1 ms and/or 2 ms; and
sending, by the eNodeB, the configuration parameter indicator to the user equipment in Radio Resource Control, RRC, signaling;
Wherein a subframe in which the uplink resource scheduling request is sent is configured as each subframe over an uplink carrier when Frequency Division Duplex, FDD, is adopted for an LTE mobile communication system and the transmission periodicity is configured as 1 ms; or
a subframe in which the uplink resource scheduling request is sent is configured as each uplink subframe in each half-fame when Time Division Duplex, TDD, is adopted for the LT'E mobile communication system and the transmission periodicity is configured as 1 ms;
wherein uplink and downlink subframes of the LTE mobile communication system are configured in a pattern 0, a pattern 1, a pattern 3, a pattern 4 or a pattern 6 when the TDD is adopted for the LTE mobile communication system.

12. The method according to claim 11, wherein:
a subframe in which the uplink resource scheduling request is sent is configured as each odd subframe or each even subframe over an uplink carrier when MD is adopted for an LTE mobile communication system and the transmission periodicity is configured as 2 ms; or
subframes in which the uplink resource scheduling request is sent are configured as any two uplink subframes in each half-frame when the TDD is adopted for the LTE mobile communication system and the transmission periodicity is configured as 2 ms.

13. The method according to claim 12, wherein:
uplink and downlink subframes of the LTE mobile communication system are configured in a pattern 0, a pattern 1, a pattern 3, a pattern 4 or a pattern 6 when TDD is adopted for the LTE mobile communication system.

14. The method according to claim 11, wherein the configuration parameter indicator is a jointly encoded indicator of the transmission periodicity and the subframe offset, and each of different configuration options for the transmission periodicity and the subframe offset is identified with a corresponding jointly encoded indicator.

* * * * *